US005288676A

United States Patent [19]

Shimada et al.

[11] Patent Number: 5,288,676

[45] Date of Patent: Feb. 22, 1994

[54] CEMENTED CARBIDE

[75] Inventors: Fumio Shimada, Ibaraki, Japan; Tadashi Kainuma, Garden Grove, Calif.

[73] Assignee: Mitsubishi Materials Corporation, Tokyo, Japan

[21] Appl. No.: 996,790

[22] Filed: Dec. 24, 1992

Related U.S. Application Data

[60] Continuation-in-part of Ser. No. 749,730, Aug. 26, 1991, abandoned, which is a division of Ser. No. 249,909, Sep. 27, 1988, Pat. No. 5,068,149, which is a continuation-in-part of Ser. No. 30,173, Mar. 25, 1987, abandoned.

[30] Foreign Application Priority Data

Mar. 28, 1986 [JP] Japan .................................. 61-68432
Mar. 28, 1986 [JP] Japan .................................. 61-68433

[51] Int. Cl.[5] .............................................. C04B 35/56

[52] U.S. Cl. ........................................ 501/93; 75/228; 75/236; 75/240; 75/242; 428/539.5

[58] Field of Search ................. 75/228, 236, 240, 242, 75/237, 239, 241; 428/539.5; 501/87, 93; C04B 35/52, 35/56

[56] References Cited

U.S. PATENT DOCUMENTS 3,409,418 11/1968 Yates .
3,409,419 11/1968 Yates .
3,451,791 6/1969 Meadows .
3,669,695 6/1972 Iler et al. .
4,046,517 9/1977 Soga .
4,047,897 9/1977 Tanaka et al. .
4,375,517 3/1983 Watanabe et al. .
4,652,157 3/1987 Uzawa et al. .
4,963,183 10/1990 Hong .

FOREIGN PATENT DOCUMENTS 894920 5/1983 Belgium . .
0560070 7/1958 Canada .
0148613 7/1985 European Pat. Off. .
2536063 5/1984 France .
53-021016 2/1978 Japan .
58-189345 11/1983 Japan .
0002647 1/1985 Japan .
61-12847 2/1986 Japan .
61-221352 10/1986 Japan .
1134941 11/1968 United Kingdom .

OTHER PUBLICATIONS

*Patent Abstracts of Japan*, vol. 10, No. 161 (C-352) (2217), Jun. 10, 1986.
*Patent Abstracts of Japan*, vol. 11, No. 63 (C-406) (2510), Feb. 26, 1987.
Hiashi Suzuki (editor), *Cemented Carbide and Sintered Hard Material*, Feb. 20, 1986, pp. 547-549, Maruzen Kabushiki Kaisha (publisher).

*Primary Examiner*—Mark L. Bell
*Assistant Examiner*—Paul Marcantoni
*Attorney, Agent, or Firm*—Scully, Scott, Murphy & Presser

[57] ABSTRACT

A cemented carbide of the invention contains at least one of cobalt and nickel; calcium, sulfur, aluminum, silicon and phosphorus; balance tungsten carbide; and unavoidable impurities. The content of cobalt or nickel should range from 4 to 35% by weight. The content of each of calcium, sulfur, aluminum and silicon should be no greater than 50 ppm by weight, while the content of phosphorus should be no greater than 20 ppm by weight. The tungsten carbide has an average crystal grain size of 0.2 to 1.5 micrometers. The cemented carbide may further contain 0.1 to 40% by weight of at least one compound which may be carbides of metals in Groups IVa, Va and VIa of the Periodic Table other than tungsten, nitrides of metals in Groups IVa and Va of the Periodic Table and solid solution of at least two of the carbides and nitrides.

2 Claims, No Drawings

CEMENTED CARBIDE

CROSS-REFERENCE TO RELATED APPLICATION

The present application is a continuation in part of our application Ser. No. 749,730 filed Aug. 26, 1991, now abandoned which is a division of our application Ser. No. 249,909 filed Sep. 27, 1988, now issued as U.S. Pat. No. 5,068,149; which is a continuation in part of our application Ser. No. 030,173 filed Mar. 25, 1987, now abandoned.

BACKGROUND OF THE INVENTION

1. Field of the Invention

The present invention pertains to a cemented carbide which exhibits excellent toughness and wear resistance and is suitable for use in solid end mills, solid drill bits and wire members.

2. Prior Art

Heretofore, print pins of a dot printer, solid end mills or solid drill bits have often been made of WC-based cemented carbide since high wear resistance is required. Such conventional cemented carbide includes a hard dispersed phase composed of tungsten carbide and a binder phase composed of 4 to 20% by weight of one or both metals of cobalt and nickel. In some cases, the hard dispersed phase further contains 0.1 to 40% by weight of one or more of compounds selected from the group consisting of carbides of metals in Groups IVa, Va and VIa of the Periodic Table other than tungsten, nitrides of metals in Groups IVa and Va of the Periodic Table and solid solution of two or more of these carbides and nitrides.

Although the prior art cemented carbides as mentioned above have been superior in wear resistance, they have been inferior in toughness, being susceptible to breakage in actual use. This has been especially the case when the cemented carbides are used with apparatuses developed in recent years wherein requirements for their performance are getting severe in order to achieve a higher speed operation as well as a higher performance.

SUMMARY OF THE INVENTION

It is therefore the object of the present invention to provide a cemented carbide which exhibits not only high wear resistance but excellent toughness as well.

According to the present invention, there is provided a cemented carbide consisting of:

at least one binder metal selected from the group consisting of cobalt and nickel in an amount from 4 to 35% by weight;

calcium, sulfur, aluminum and silicon each in a finite amount of no greater than 50 ppm by weight;

phosphorus in a finite amount of no greater than 20 ppm by weight;

balance tungsten carbide having an average crystal grain size of 0.2 to 1.5 micrometers; and unavoidable impurities.

In the foregoing, the cemented carbide may optionally contain at least one hard phase compound selected from the group consisting of carbides of metals in Groups IVa, Va and VIa of the Periodic Table other than tungsten, nitrides of metals in Groups IVa and Va of the Periodic Table and solid solution of at least two of the carbides and nitrides. In such a case, it is preferable that the hard phase compound be present in an amount from 0.1 to 40% by weight.

DESCRIPTION OF THE INVENTION

The inventors have made an extensive study over the improvement of such a prior art cemented carbide, and have particularly considered controlling the constituents which have heretofore been regarded as impurities. As a result, the inventors have obtained a cemented carbide in accordance with the present invention which consists of:

at least one binder metal selected from the group consisting of a cobalt and nickel in an amount from 4 to35% by weight;

calcium, sulfur, aluminum and silicon each in a finite amount of no greater than 50 ppm by weight;

phosphorus in a finite amount of no greater than 20 ppm by weight;

balance tungsten carbide having an average crystal grain size of 0.2 to 1.5 micrometers; and unavoidable impurities.

In the foregoing, if the content of cobalt or nickel serving as the binder phase is less than 4% by weight, the cemented carbide fails to have sufficient toughness. On the other hand, if the content of the binder phase exceeds 35% by weight, the cemented carbide becomes less resistant to wear.

In addition, the contents of calcium, sulfur, aluminum, silicon and phosphorus to be controlled are very small, and hence a practical method for controlling their contents on an industrial basis would be to regulate the amounts contained in the material powders to be blended. With this method, the lower limits of their contents can be controlled up to 0.1 ppm by weight. In contrast, with respect to calcium, sulfur, aluminum and silicon, the upper limits of their contents should be no greater than 50 ppm by weight. If the content exceeds 50 ppm by weight, each constituent tends to aggregate alone or as a compound, and breakage may occur from the aggregate thus formed, thereby deteriorating toughness. Furthermore, with respect to phosphorus, it should be no greater than 20 ppm by weight. If the phosphorous content exceeds 20 ppm by weight, phosphorous tends to become segregated at grain boundaries, thereby deteriorating toughness.

Furthermore, tungsten carbide contained in the cemented carbide of the present invention should have an average crystal grain size of 0.2 to 1.5 micrometers. In order to obtain cemented carbide having higher toughness, it is desirable to make the crystal grain size of tungsten carbide as small as possible. Due to the difficulties in the manufacture, however, cemented carbide with tungsten carbide of an average crystal grain size smaller than 0.2 micrometers cannot be obtained on an industrial basis. On the other hand, if the average crystal grain size of tungsten carbide exceeds 1.5 micrometers, the resulting cemented carbide fails to exhibit sufficiently high toughness.

Further, in order to increase wear resistance, at least one hard phase compound selected from the group consisting of carbides of metals in Groups IVa, Va and VIa of the Periodic Table except tungsten, nitrides of metals in Groups IVa and Va of the Periodic Table and solid solution of two or more of the above carbides and nitrides may be contained in the hard dispersed phase. In such a case, the amount of the compound to be added should range from 0.1 to 40% by weight. If the amount is less than 0.1% by weight, no increase in wear resistance can be expected practically. On the other hand, the hard dispersed phase in excess of 40% by weight adversely affects the toughness of the cemented carbide.

In the cemented carbide having the aforesaid construction, the contents of calcium, sulfur, aluminum, silicon and phosphorous are controlled in prescribed amounts, and the average crystal grain size of tungsten carbide is regulated small. Therefore, the cemented carbide exhibits high toughness, and when it is used to manufacture solid end mills or drill bits, the resulting tools become less susceptible to fracture, thereby providing a very high reliability.

Further, if the above cemented carbide is modified so that the average crystal grain size of the tungsten carbide ranges from 0.2 to 1.0 micrometers, and the modified cemented carbide is used to manufacture wire members, the resulting wire members exhibit sufficiently high toughness to such an extent that they can be bent at a radius of curvature satisfying the following relationship:

(15 to 50)×(diameter of wire member).

The cemented carbide as described above is produced by a conventional process. The inventors, however, have unexpectedly found that if a sintered compact is subjected to hot plastic working such as hot drawing, hot rolling with grooved rolls, hot forging and the like prior to grinding, the cemented carbide product thus obtained exhibits higher toughness than the product produced without hot-working. In such a case, however, the content of the binder phase should be preferably within a range of 15 to 35% by weight, and the hot-worked microstructure of the binder phase should have an average crystal grain size of 5 to 400 micrometers. When the cemented carbide thus modified is used to manufacture a wire member of a diameter of 0.05 to 2 mm, the resulting wire member can be bent at a reduced radius of curvature of the following relationship:

(10 to 40)×(diameter of wire member).

Although the wire member usually has a circular cross-section, it may have a regular polygonal cross-section. In such a case, the distance between an axis of the wire member and a point on a periphery of the wire member disposed farthest from the axis of the wire member, i.e., an equivalent radius of the wire member should be within the range of 0.025 to 1 mm.

The invention will now be described in more detail with reference to the following examples.

EXAMPLE 1

As powder materials, tungsten carbide powder having an average particle size of 0.2 to 1.5 micrometers, cobalt powder having an average particle size of 1.2 micrometers nickel powder having an average particle size of 1.5 micrometers were prepared. The tungsten carbide powder contained 15 ppm by weight of calcium, 15 ppm by weight of sulfur, 5 ppm by weight of aluminum, 10 ppm by weight of silicon and 7 ppm by weight of phosphorous. The cobalt powder contained 12 ppm by weight of calcium, 10 ppm by weight of sulfur, 5 ppm by weight of aluminum, 8 ppm by weight of silicon and 10 ppm by weight of phosphorous, whereas the nickel powder contained 17 ppm by weight of calcium, 10 ppm by weight of sulfur, 8 ppm by weight of aluminum, 20 ppm by weight of silicon and 8 ppm by weight of phosphorous. These powders were blended to produce the compositions set forth in Tables 1-1 and 1-2, and were subjected to wet mixing in a ball mill for 72 hours, following which the mixtures were compressed into green compacts. Subsequently, the green compacts were subjected to sintering at sintering temperatures as set forth in Table 1-1 and Table 1-2 in a vacuum for 1 hour. Furthermore, the sintered products thus produced were subjected to hot isostatic pressing in 1,000 atm at a temperature of 1,330° C. for 1 hour, and thus the cemented carbides 1–20 of the present invention were produced.

For comparison purposes, tungsten carbide powder having an average particle size of 1.5 to 3.0 micrometers, cobalt powder having an average particle size of 1.2 micrometers, nickel powder having an average particle size of 1.5 micrometers were prepared. The tungsten carbide powder contained 80 ppm by weight of calcium, 60 ppm by weight of sulfur, 70 ppm by weight of aluminum, 65 ppm by weight of silicon and 60 ppm by weight of phosphorous. The cobalt powder contained 62 ppm by weight of calcium, 55 ppm by weight of sulfur, 65 ppm by weight of aluminum, 70 ppm by weight of silicon and 70 ppm by weight of phosphorous, whereas the nickel powder contained 75 ppm by weight of calcium, 70 ppm by weight of sulfur, 70 ppm by weight of aluminum, 60 ppm by weight of silicon and 75 ppm by weight of phosphorous. These powders were blended to produce the compositions set forth in Tables 2-1 and 2-2, and the same procedures as described above were carried out to provide comparative cemented carbides 1 to 20.

Thereafter, test pieces were prepared using a diamond grinding tool from the cemented carbides 1–20 of the invention as well as from the comparative cemented carbides 1–20, and the rupture strength and the hardness in HRA scale were measured. Furthermore, the contents of calcium, sulfur, aluminum, silicon and phosphorous were measured. Furthermore, the average grain size of tungsten carbide as well as the average grain size of the components constituting the hard dispersed phase were measured using SEM (Scanning Electron Microscope) observation. All of the results of the above measurements are set forth in Tables 1-1 and 1-2, and Tables 2-1 and 2-2.

As will be seen from the results, it is clear that the cemented carbides of the invention, in which the contents of calcium, sulfur, aluminum, silicon and phosphorous as well as the average grain size of tungsten carbide are controlled as specified above, exhibit higher rupture strength and hardness compared with the comparative cemented carbides.

EXAMPLE 2

As tungsten carbide powder materials for producing cemented carbides of the invention, three kinds of tungsten carbide powders each having an average particle size of 0.2 to 1.5 micrometers were prepared. The first kind of tungsten carbide contained 15 ppm by weight of calcium, 15 ppm by weight of sulfur, 5 ppm by weight of aluminum, 10 pm by weight of silicon and 7 ppm by weight of phosphorous. The second kind of tungsten carbide contained 15 ppm by weight of calcium, 15 ppm by weight of sulfur, 2 ppm by weight of aluminum, 10 ppm by weight of silicon and 4 ppm by weight of phosphorous, while the third kind contained 10 ppm by weight of calcium, 10 ppm by weight of sulfur, 5 ppm by weight of aluminum, 7 ppm by weight of silicon and 7 ppm by weight of phosphorous. Furthermore, tungsten carbide powder containing 80 ppm by weight of calcium, 60 ppm by weight of sulfur, 70 ppm by weight of aluminum, 65 ppm by weight of silicon and 60 ppm by weight of phosphorous was prepared as tungsten powder material for producing comparative cemented carbides. For other powder materials, powders having an average particle size of 0.2 to 3.0 micrometers were used. These powders were blended to produce the compositions set forth in Tables 3-1 and 3-2, and were subjected to wet mixing in a ball mill for 72 hours. After having added a small amount of wax, these mixtures were subjected to extrusion under a pressure of 15 kg/mm$^2$ to produce cylindrical green compacts having a diameter of 3.55 mm. Subsequently, the green compacts were heated at 400° to 600° C. for three hours to remove the wax, and were subjected to sintering at sintering temperatures as set forth in Table 3-1 and Table 3-2 in a vacuum for 1 hour. Furthermore, the sintered products thus produced were subjected to hot isostatic pressing in 1,000 atm at a temperature of 1,330° C. for 1 hour. Thus, the cemented carbides 21–28 of the present invention as well as the comparative cemented carbides 21–28 were produced. In the Table 3-1, the cemented carbides 21–22, **23*a*, 24, 25*a* and 26–28 of the invention were obtained using the first kind of tungsten carbide, while the cemented carbides 23*b*, 25*b* and the cemented carbides 23*c*, 25*c*** were obtained using the second and third kinds of tungsten powders, respectively.

Thereafter, as to the cemented carbides thus obtained, the rupture strength and the hardness in HRA scale were measured, and the contents of calcium, sulfur, aluminum, silicon and phosphorous therein were measured. Furthermore, the average grain size of tungsten carbide as well as the average grain size of the components constituting the hard dispersed phase were measured using SEM observation. All of the results of the above measurements are set forth in Tables 3-1 and 3-2.

Moreover, the cemented carbides 21–28 of the invention and the comparative cemented carbides 21–28 were ground to provide miniature size drill bits each having a overall length of 38.1 mm, a shank diameter of 3.175 mm and a drill diameter of 0.4 mm and a cutting edge length of 6 mm. Then, in order to evaluate the drill bits thus obtained, a drilling test was conducted under the following conditions:

Workpiece: printed board composed of four layers of glass and epoxy resin

Rotating speed: 70,000 rpm

Drill feed: 2,100 mm/minute.

In the drilling test, two workpieces were placed one upon another, and the reduction in drill diameter after 5,000 hits was measured to evaluate the wear resistance. Furthermore, three workpieces were placed one upon another, and 1,000 hits were made using twenty drill bits at an increased drill feed of 3,000 mm/minute. Then, the number of the drill bits broken after the hits were counted to evaluate the resistance to breakage. The results are all set forth in Table 3-1 and 3-2.

As will be seen from the results, it is clear that the cemented carbides of the invention exhibit higher wear resistance and resistance to breakage compared with the comparative cemented carbides. Furthermore, comparing the cemented carbides **23*a* to 23*c*** with each other, it is seen that the contents of aluminum and phosphorus are very crucial to the improvement of the characteristics.

TABLE 1

| | | Cemented carbides of the invention | | | | | | | | | |
|---|---|---|---|---|---|---|---|---|---|---|---|
| | | 1 | 2 | 3 | 4 | 5 | 6 | 7 | 8 | 9 | 10 |
| Blend composition (wt %) | WC | Bal. | Bal. | Bal. | Bal. | Bal. | Bal. | Bal. | Bal. | Bal. | Bal. |
| | Co | 4 | 10 | 10 | 10 | 10 | 10 | 12 | 12 | 12 | 12 |
| | Ni | — | — | 5 | — | — | — | — | — | — | — |
| | Hard phase | — | — | — | 0.6 $Cr_3C_2$ | 10TaC-5TiCN | 0.5$Cr_3C_2$-0.4VC | — | 0.9$Cr_3C_2$-0.5VC | 11TiC-9TaC | 0.8$Cr_3C_2$-0.5TaC |
| Sintering temperature (°C.) | | 1500 | 1450 | 1430 | 1430 | 1430 | 1430 | 1400 | 1400 | 1400 | 1400 |
| Average grain size of WC (μm) | | 0.9 | 1.0 | 1.4 | 0.8 | 0.7 | 0.5 | 1.2 | 0.3 | 1.0 | 0.8 |
| Average grain size of hard phase (μm) | | — | — | — | Dissolved in binder | 0.7 | Dissolved in binder | — | Dissolved in binder | 1.0 | 0.9 |
| HRA | | 92.5 | 90.0 | 89.5 | 91.2 | 91.0 | 92.5 | 89.2 | 92.0 | 89.7 | 91.1 |
| Rupture strength (Kg/mm$^2$) | | 190 | 200 | 220 | 340 | 240 | 380 | 240 | 400 | 260 | 360 |
| Content of each constituent in alloy (ppm) | Ca | 20 | 20 | 27 | 25 | 40 | 28 | 18 | 30 | 46 | 28 |
| | S | 8 | 7 | 13 | 15 | 30 | 19 | 6 | 26 | 38 | 28 |
| | Al | 6 | 7 | 7 | 6 | 9 | 6 | 5 | 7 | 9 | 6 |
| | Si | 15 | 14 | 15 | 17 | 20 | 18 | 14 | 20 | 35 | 24 |
| | P | 8 | 7 | 8 | 9 | 18 | 10 | 6 | 7 | 18 | 15 |

| | | Cemented carbides of the invention | | | | | | | | | |
|---|---|---|---|---|---|---|---|---|---|---|---|
| | | 11 | 12 | 13 | 14 | 15 | 16 | 17 | 18 | 19 | 20 |
| Blend composition (wt %) | WC | Bal. | Bal. | Bal. | Bal. | Bal. | Bal. | Bal. | Bal. | Bal. | Bal. |
| | Co | 16 | 16 | 16 | 20 | 20 | 25 | 25 | 25 | 30 | 35 |
| | Ni | 10 | — | — | — | — | — | 10 | — | — | — |
| | Hard phase | — | 4TiC-2TiN | 18TiC-20TaC | — | 0.9VC | — | — | 1.2$Cr_3C_2$-0.6VC | — | — |
| Sintering temperature (°C.) | | 1380 | 1380 | 1380 | 1350 | 1350 | 1350 | 1350 | 1350 | 1330 | 1330 |
| Average grain size of WC (μm) | | 1.4 | 1.2 | 1.3 | 0.5 | 0.3 | 0.6 | 1.0 | 1.2 | 0.8 | 1.0 |
| Average grain size of hard phase (μm) | | — | 1.1 | 1.4 | — | Dissolved in binder | — | — | Dissolved in binder | — | — |

TABLE 1-continued

| | | | | | | | | | | | |
|---|---|---|---|---|---|---|---|---|---|---|---|
| HRA | | 88.7 | 89.3 | 89.0 | 89.1 | 89.2 | 88.5 | 88.0 | 89.6 | 88.0 | 87.5 |
| Rupture strength ($Kg/mm^2$) | | 275 | 290 | 280 | 300 | 440 | 315 | 350 | 450 | 330 | 370 |
| Content of | Ca | 30 | 35 | 48 | 14 | 30 | 14 | 33 | 32 | 14 | 14 |
| each constituent | S | 20 | 27 | 40 | 12 | 26 | 25 | 26 | 40 | 30 | 25 |
| in alloy | Al | 6 | 8 | 4 | 5 | 6 | 5 | 6 | 7 | 6 | 6 |
| (ppm) | Si | 16 | 26 | 47 | 25 | 30 | 33 | 36 | 40 | 39 | 43 |
| | P | 5 | 14 | 20 | 4 | 6 | 5 | 5 | 9 | 4 | 2 |

TABLE 2

| | | Cemented carbides of the invention | | | | | | | | | |
|---|---|---|---|---|---|---|---|---|---|---|---|
| | | 1 | 2 | 3 | 4 | 5 | 6 | 7 | 8 | 9 | 10 |
| Blend composition (wt %) | WC | Bal. | Bal. | Bal. | Bal. | Bal. | Bal. | Bal. | Bal. | Bal. | Bal. |
| | Co | 4 | 10 | 10 | 10 | 10 | 10 | 12 | 12 | 12 | 12 |
| | Ni | — | — | 5 | — | — | — | — | — | — | — |
| | Hard phase | — | — | — | 0.6 $Cr_3C_2$ | 10TaC-5TiCN | 0.5$Cr_3C_2$-0.4VC | — | 0.9$Cr_3C_2$-0.5VC | 11TiC-9TaC | 0.8$Cr_3C_2$-0.5TaC |
| Sintering temperature (°C.) | | 1500 | 1450 | 1430 | 1430 | 1430 | 1430 | 1400 | 1400 | 1400 | 1400 |
| Average grain size of WC (μm) | | 1.7 | 2.0 | 2.5 | 1.8 | 2.5 | 1.7 | 2.7 | 1.8 | 2.3 | 2.0 |
| Average grain size of hard phase (μm) | | — | — | — | Dissolved in binder | 1.8 | Dissolved in binder | — | Dissolved in binder | 1.9 | 1.6 |
| HRA | | 91.8 | 89.1 | 88.8 | 90.4 | 90.2 | 92.0 | 88.6 | 91.3 | 89.0 | 90.4 |
| Rupture strength ($Kg/mm^2$) | | 135 | 160 | 175 | 280 | 190 | 300 | 200 | 350 | 200 | 300 |
| Content of each constituent in alloy (ppm) | Ca | 80 | 80 | 85 | 84 | 97 | 85 | 81 | 93 | 98 | 84 |
| | S | 78 | 60 | 58 | 64 | 86 | 75 | 64 | 86 | 90 | 83 |
| | Al | 70 | 72 | 67 | 71 | 62 | 69 | 71 | 73 | 57 | 73 |
| | Si | 65 | 63 | 65 | 68 | 71 | 69 | 64 | 80 | 95 | 65 |
| | P | 50 | 45 | 51 | 53 | 60 | 55 | 40 | 44 | 62 | 60 |

| | | Cemented carbides of the invention | | | | | | | | | |
|---|---|---|---|---|---|---|---|---|---|---|---|
| | | 11 | 12 | 13 | 14 | 15 | 16 | 17 | 18 | 19 | 20 |
| Blend composition (wt %) | WC | Bal. | Bal. | Bal. | Bal. | Bal. | Bal. | Bal. | Bal. | Bal. | Bal. |
| | Co | 16 | 16 | 16 | 20 | 20 | 25 | 25 | 25 | 30 | 35 |
| | Ni | 10 | — | — | — | — | — | 10 | — | — | — |
| | Hard phase | — | 4TiC-2TiN | 18TiC-20TaC | — | 0.9VC | — | — | 1.2$Cr_3C_2$-0.6VC | — | — |
| Sintering temperature (°C.) | | 1380 | 1380 | 1380 | 1350 | 1350 | 1350 | 1350 | 1350 | 1330 | 1330 |
| Average grain size of WC (μm) | | 2.8 | 1.7 | 2.3 | 3.4 | 1.8 | 3.7 | 3.5 | 1.7 | 4.0 | 4.2 |
| Average grain size of hard phase (μm) | | — | 1.6 | 2.0 | — | Dissolved in binder | — | — | Dissolved in binder | — | — |
| HRA | | 88.0 | 88.7 | 88.5 | 88.7 | 88.1 | 87.9 | 87.6 | 89.0 | 87.4 | 87.0 |
| Rupture strength ($Kg/mm^2$) | | 210 | 230 | 220 | 340 | 220 | 270 | 300 | 380 | 275 | 320 |
| Content of each constituent in alloy (ppm) | Ca | 93 | 98 | 52 | 76 | 96 | 54 | 79 | 75 | 56 | 57 |
| | S | 82 | 90 | 54 | 70 | 88 | 65 | 72 | 80 | 65 | 68 |
| | Al | 69 | 59 | 80 | 55 | 62 | 73 | 78 | 80 | 81 | |
| | Si | 63 | 66 | 65 | 70 | 110 | 96 | 92 | 83 | 80 | 95 |
| | P | 38 | 58 | 39 | 40 | 70 | 38 | 39 | 53 | 36 | 30 |

TABLE 3

| | | Cemented carbides of the invention | | | | | | | | | |
|---|---|---|---|---|---|---|---|---|---|---|---|
| | | 21 | 22 | 23a | 23b | 23c | 24 | 25a | 25b | 25c | 26 |
| Blend composition (wt %) | WC | Bal. | Bal. | Bal. | Bal. | Bal. | Bal. | Bal. | Bal. | Bal. | Bal. |
| | Co | 4 | 6 | 10 | 10 | 10 | 10 | 12 | 12 | 12 | 12 |
| | Ni | — | 2 | — | — | — | — | — | — | — | — |
| | Hard phase | 0.7TaC | — | 0.5$Cr_3C_2$ | 0.5$Cr_3C_2$ | 0.5$Cr_3C_2$ | 0.5$Cr_3C_2$-0.3TaC | 0.6$Cr_3C_2$-0.5VC | 0.6$Cr_3C_2$-0.5VC | 0.6$Cr_3C_2$-0.5VC | 0.5VC |
| Sintering temperature (°C.) | | 1500 | 1480 | 1430 | 1430 | 1430 | 1430 | 1400 | 1400 | 1400 | 1400 |
| Average grain size of WC (μm) | | 1.0 | 1.2 | 0.8 | 0.8 | 0.8 | 0.7 | 0.6 | 0.6 | 0.6 | 0.8 |
| Average grain size of hard phase (μm) | | 1.0 | — | Dissolved in binder | Dissolved in binder | Dissolved in binder | 1.4 | Dissolved in binder | Dissolved in binder | Dissolved in binder | Dissolved in binder |
| HRA | | 92.5 | 90.8 | 91.6 | 91.6 | 91.6 | 91.9 | 92.0 | 92.0 | 92.0 | 91.6 |
| Content of each constituent in alloy (ppm) | Ca | 13 | 18 | 20 | 20 | 13 | 21 | 23 | 23 | 15 | 19 |
| | S | 8 | 13 | 13 | 13 | 10 | 22 | 22 | 22 | 18 | 19 |
| | Al | 7 | 8 | 7 | 3 | 7 | 6 | 8 | 3 | 8 | 6 |
| | Si | 11 | 13 | 11 | 11 | 5 | 15 | 16 | 16 | 11 | 20 |

TABLE 3-continued

| | | | | | | | | | | | |
|---|---|---|---|---|---|---|---|---|---|---|---|
| | P | 6 | 6 | 7 | 2 | 7 | 10 | 9 | 5 | 9 | 5 |
| Reduction in drill diameter (μm) | | 12 | 25 | 17 | 17 | 17 | 13 | 15 | 15 | 15 | 18 |
| Broken drills/Tested drills | | 3/20 | 2/20 | 2/20 | 0/20 | 2/20 | 2/20 | 1/20 | 0/20 | 1/20 | 3/20 |
| | | Cemented carbides of the invention | | Comparative Cemented Carbides | | | | | | | |
| | | 27 | 28 | 21 | 22 | 23 | 24 | 25 | 26 | 27 | 28 |
| Blend composition (wt %) | WC | Bal. | Bal. | Bal. | Bal. | Bal. | Bal. | Bal. | Bal. | Bal. | Bal. |
| | Co | 12 | 16 | 4 | 6 | 10 | 10 | 12 | 12 | 12 | 16 |
| | Ni | — | — | — | 2 | — | — | — | — | — | — |
| | Hard phase | 0.5CrN-0.4VN | $0.9Cr_2O_3$-$0.6V_2O_5$ | 0.7TaC | — | $0.5Cr_3C_2$ | $0.5Cr_3C_2$-0.3TaC | $0.6Cr_3C_2$-0.5VC | 0.5VC | 0.5CrN-0.4VN | $0.9Cr_2O_3$-$0.6V_2O_5$ |
| Sintering temperature (°C.) | | 1400 | 1380 | 1500 | 1480 | 1430 | 1430 | 1400 | 1400 | 1400 | 1380 |
| Average grain size of WC (μm) | | 0.7 | 1.3 | 2.2 | 3.0 | 2.0 | 1.9 | 1.7 | 2.5 | 2.3 | 3.0 |
| Average grain size of hard phase (μm) | | Dissolved in binder | Dissolved in binder | 2.0 | — | Dissolved in binder | 1.7 | Dissolved in binder | Dissolved in binder | Dissolved in binder | Dissolved in binder |
| HRA | | 91.8 | 91.1 | 91.8 | 89.0 | 90.3 | 90.5 | 91.0 | 90.2 | 90.5 | 89.8 |
| Content of each constituent in alloy (ppm) | Ca | 20 | 22 | 83 | 87 | 88 | 90 | 92 | 88 | 90 | 92 |
| | S | 18 | 21 | 74 | 70 | 72 | 80 | 82 | 78 | 76 | 77 |
| | Al | 7 | 8 | 70 | 65 | 67 | 71 | 73 | 70 | 67 | 67 |
| | Si | 13 | 18 | 65 | 70 | 72 | 68 | 71 | 69 | 63 | 65 |
| | P | 7 | 7 | 50 | 55 | 57 | 60 | 63 | 58 | 65 | 65 |
| Reduction in drill diameter (μm) | | 16 | 20 | 30 | 60 | 48 | 42 | 37 | 53 | 45 | 55 |
| Broken drills/Tested drills | | 2/20 | 0/20 | 20/20 | 18/20 | 19/20 | 15/20 | 13/20 | 18/20 | 18/20 | 12/20 |

What is claimed is:

1. A cemented carbide consisting essentially of:

at least one binder metal selected from the group consisting of cobalt and nickel in an amount from 4 to 35% by weight;

balance tungsten carbide having an average crystal grain size of 0.2 to 1.5 micrometers; and unavoidable impurities consisting essentially of calcium, sulfur, aluminum, silicon and phosphorus, wherein said calcium sulfur, aluminum and silicon are each present in a finite amount of no greater than 50 ppm by weight, and said phosphorus is present in a finite amount of no greater than 20 ppm by weight.

2. A cemented carbide consisting essentially of:

at least one binder metal selected from the group consisting of cobalt and nickel in an amount from 4 to 35% by weight;

at least one hard phase compound in an amount from 0.1 to 40% by weight, said at least one hard phase compound being selected from the group consisting of carbides of Ti, V, Cr and Ta, nitrides of Ti, V, Cr and Ta and solid solution of at least two of said carbides and nitrides;

balance tungsten carbide having an average crystal grain size of 0.2 to 1.5 micrometers; and unavoidable impurities consisting essentially of calcium, sulfur, aluminum, silicon and phosphorus, wherein said calcium, sulfur, aluminum and silicon are each present in a finite amount of no greater than 50 ppm by weight, and said phosphorus is present in a finite amount of no greater than 20 ppm by weight.

* * * * *

UNITED STATES PATENT AND TRADEMARK OFFICE

CERTIFICATE OF CORRECTION

PATENT NO. : 5,288,676
DATED : February 22, 1994
INVENTOR(S) : Fumio Shimada, et al.

It is certified that error appears in the above-indentified patent and that said Letters Patent is hereby corrected as shown below:

Column 2, line 14: "to35" should read --to 35--

Column 4, line 63: "pm" should read --ppm--

Columns 7 & 8, lines 13 & 35, Table 2: "Cemented carbides of the invention" should read --Comparative Cemented carbides--

Column 8, line 46, Table 2: "81 " should read --80 81--

Column 8, line 47, Table 2: "80 95" should read --80 85--

Signed and Sealed this

Twenty-third Day of August, 1994

*Attest:*

BRUCE LEHMAN

*Attesting Officer*

*Commissioner of Patents and Trademarks*